United States Patent
Gehrke et al.

(10) Patent No.: US 10,110,079 B2
(45) Date of Patent: Oct. 23, 2018

(54) WOUND FIELD GENERATOR SYSTEM FEATURING COMBINED PERMANENT MAGNET GENERATOR EXCITATION WITH EXCITER STATOR

(71) Applicant: Honeywell International Inc., Morristown, NJ (US)

(72) Inventors: Jens Gehrke, Rancho Palos Verdes, CA (US); Simon Waddell, Oro Valley, AZ (US); Wayne Pearson, Oro Valley, AZ (US); Ming Xu, Oro Valley, AZ (US); Cristian Anghel, Oro Valley, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 723 days.

(21) Appl. No.: 14/673,319

(22) Filed: Mar. 30, 2015

(65) Prior Publication Data
US 2016/0294238 A1 Oct. 6, 2016

(51) Int. Cl.
| H02K 3/16 | (2006.01) |
| H02K 19/34 | (2006.01) |
| H02K 7/20 | (2006.01) |
| H02K 11/042 | (2016.01) |
| H02K 19/28 | (2006.01) |
| H02K 21/04 | (2006.01) |

(52) U.S. Cl.
CPC ............... *H02K 3/16* (2013.01); *H02K 7/20* (2013.01); *H02K 11/042* (2013.01); *H02K 19/28* (2013.01); *H02K 19/34* (2013.01); *H02K 21/04* (2013.01)

(58) Field of Classification Search
CPC ........ H02K 3/16; H02K 11/042; H02K 19/34; H02K 7/20; H02K 19/28; H02K 21/04; H02K 11/04
USPC ................................................... 310/179–210
See application file for complete search history.

(56) References Cited

U.S. PATENT DOCUMENTS

| 3,010,040 A | 11/1961 | Braun |
| 3,034,035 A | 5/1962 | Baumann et al. |
| 4,045,718 A | 8/1977 | Gray |
| 4,647,806 A * | 3/1987 | Giuffrida ............... H02K 19/38 310/112 |
| 4,755,736 A | 7/1988 | Fluegel |
| 5,233,249 A | 8/1993 | Schaeftlmeier et al. |
| 5,764,036 A * | 6/1998 | Vaidya ................... H02K 19/34 310/149 |
| 6,864,608 B2 | 3/2005 | Kang et al. |

(Continued)

OTHER PUBLICATIONS

A Novel Combination of Permanent Magnet Generator and Exciter.

(Continued)

*Primary Examiner* — Naishadh Desai
(74) *Attorney, Agent, or Firm* — Shimokaji IP

(57) ABSTRACT

The present disclosure broadly relates to apparatuses and methods for generating electric power. More particularly, the present disclosure relates to a self-excited electric generator. The self-excited electric generator may include auxiliary windings to provide a source of electricity to an associated generator control unit (GCU). The apparatuses and methods of the present invention may provide added benefits of reducing excitation requirements from the GCU. Thereby, the apparatuses and methods may reduce cost, weight, and size of an electric generator, and may increase reliability of associated systems.

19 Claims, 4 Drawing Sheets

(56) References Cited

U.S. PATENT DOCUMENTS

| | | | |
|---|---|---|---|
| 8,575,809 B2* | 11/2013 | Stiesdal | H02K 3/18 |
| | | | 310/180 |
| 2004/0145266 A1* | 7/2004 | Gladkov | H02K 3/28 |
| | | | 310/180 |
| 2011/0018579 A1 | 1/2011 | Stanton | |
| 2014/0265693 A1* | 9/2014 | Gieras | H02P 9/00 |
| | | | 310/112 |
| 2014/0339928 A1* | 11/2014 | Phillips | F03B 13/16 |
| | | | 310/30 |

OTHER PUBLICATIONS

Control of a Hybrid Excitation Synchronous Generator for Aircraft Applications.

European Search Report in EP Application No. 16162109.9 dated Aug. 31, 2016.

* cited by examiner

WOUND FIELD GENERATOR SYSTEM FEATURING COMBINED PERMANENT MAGNET GENERATOR EXCITATION WITH EXCITER STATOR

BACKGROUND OF THE INVENTION

Brushless, self-excited generators, for aircraft electric power generation, are typically three-stage machines. The three stages include: 1) a permanent magnet generator (PMG), 2) an exciter generator, and 3) a main generator.

In addition to providing electric power to auxiliary equipment in an aircraft, the main generator may be used to start main engines of the aircraft and/or to start an auxiliary power unit (APU) engine.

Elimination of the separate PMG is desirable. Providing an auxiliary source of electric power to an associated generator control unit (GCU) is also desirable.

SUMMARY OF THE INVENTION

In one aspect of the present invention, a self-exciting electrical generator includes a main generating including a rotor and a stator, wherein the rotor includes a plurality of main stator windings and a plurality of auxiliary windings, wherein the main stator windings include a first gauge wire and the auxiliary windings include a second gauge wire, wherein a second diameter of the second gauge wire is less than a first diameter of the first gauge wire, wherein the main stator windings are configured to supply electrical power to an electrical load bus, wherein the auxiliary windings are configured to supply electrical power to a generator control unit, and wherein the rotor includes a plurality of field windings configured to receive electrical power from an exciter.

In another aspect of the present invention, a self-exciting electrical generator assembly includes an exciter generator; and a main generating including a rotor and a stator, wherein the rotor includes a plurality of main stator windings and a plurality of auxiliary stator windings electrically isolated from the main stator windings, and wherein the rotor includes a plurality of field windings configured to receive electrical power from the exciter generator.

In a further aspect of the present invention, an electrical generator system includes a generator control unit; an exciter generator; and a main generator including a rotor and a stator, wherein the stator includes a plurality of main stator windings to supply electrical power to an electrical load bus and a plurality of auxiliary windings to supply electrical power to the generator control unit.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

Generally, embodiments of the present invention may provide self-excitation of a main electric generator while satisfying short circuit operation requirements of an associated generator control unit (GCU). For example, a stator of an exciter generator may include permanent magnets to provide excitation of the main generator. A stator of the main generator may include auxiliary windings to provide electric power to the GCU.

Figure 1:
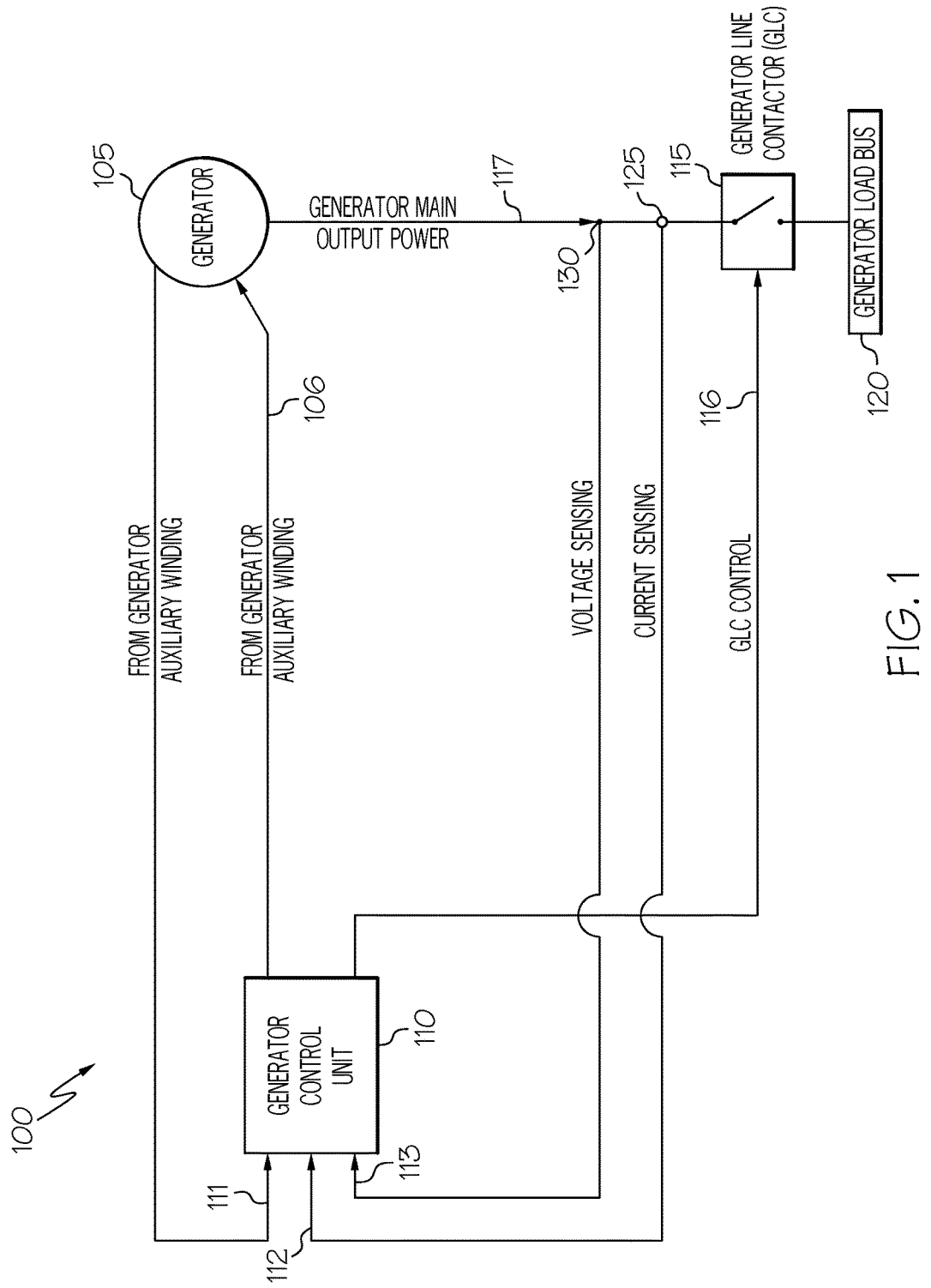
FIG. 1 depicts a block diagram of an electrical power generation system according to an exemplary embodiment of the present invention.

Turning to FIG. 1, a block diagram of an electrical generation system 100 may include a generator/exciter 105, a generator control unit (GCU) 110, a generator line controller (GLC) 115, and a generator load bus 120. The GCU 110 may receive an electric power input 111 from an auxiliary winding of the generator/exciter 105. The GCU 110 may also receive a current input 112 from a current sensor 125 and/or a voltage input 113 from a voltage sensor 130 from an output of the generator/exciter 105. The GCU 110 may determine an excitation output signal 106 and/or a GLC output signal 116 based on, for example, the electric power input 111, the current input 112 and/or the voltage input 113. In turn, a generator/exciter electric power output 117 may be based, for example, on the excitation output signal 106. Furthermore, a state (e.g., an open state or a closed state) of the GLC 115 may be based, for example, on the GLC output signal 116.

Figure 2:
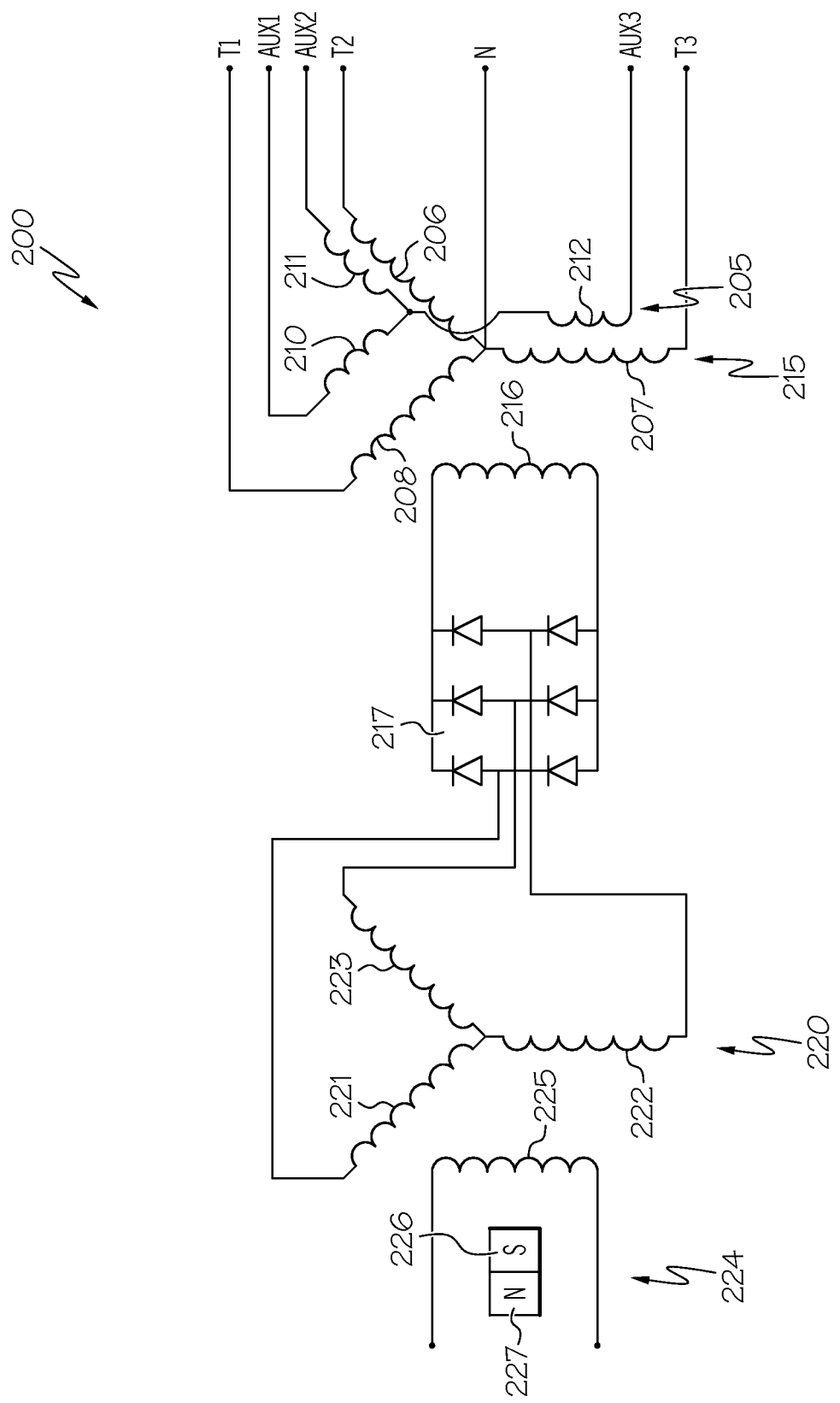
FIG. 2 depicts an electrical schematic for an electrical power generation system according to an exemplary embodiment of the present invention.

With reference to FIG. 2, an electrical schematic diagram of an electric power generation system 200 may include a main stator 205, a main rotor 215, rotating rectifiers 217, an exciter rotor 220, and an exciter stator 224. The electrical power generation system 200 may be similar to, for example, the exciter/generator 105 of FIG. 1. The main stator 205 and the main rotor 215 may be included within, for example, a main generator (e.g., a main generator of generator/exciter 105 of FIG. 1). The exciter rotor 220 and the exciter stator 224 may be included within, for example, an exciter generator (e.g., an exciter of generator/exciter 105 of FIG. 1).

As illustrated in FIG. 2, the main stator may include a first main winding 206, a second main winding 207, and a third main winding 208. The first main winding 206, the second main winding 207, and the third main winding 208 may provide electric power to, for example, an electrical system (e.g., electric bus 120 of FIG. 1) of an aircraft.

The main stator 205 may further include a first auxiliary winding 210, a second auxiliary winding 211, and a third auxiliary winding 212. The first auxiliary winding 210, the second auxiliary winding 211, and the third auxiliary winding 212 may provide electric power to, for example, a GCU (e.g., GCU 110 of FIG. 1). By providing the auxiliary windings 210, 211, 212 separate from the main windings 206, 207, 208, a short circuit on the main windings (or electric load bus) will not impose a short circuit on the electric power to the GCU. As further illustrated in FIG. 2, the main rotor 215 may include a rotor coil 216 and rotating rectifiers 217.

The exciter rotor 220 may include a first exciter rotor winding 221, a second exciter rotor winding 222, and a third exciter rotor winding 223. The exciter stator 224 may include an exciter stator winding 225 and an exciter permanent magnet having a South magnetic pole 226 and a North magnetic pole 227. While the exciter stator 224 is depicted in FIG. 2 as only including a single exciter stator winding 225 and a single exciter permanent magnet 226, 227, it should be understood that the exciter stator 224 may include any number of exciter stator windings 225 and/or any number of exciter permanent magnets 226, 227 (e.g., exciter stator windings and exciter stator permanent magnets as depicted in the exciter generator cross section of FIG. 4).

Generally, a main generator may have phase windings in a stator, and field windings on a rotor. The main generator may further include an auxiliary winding. An exciter generator may have a three-phase winding on a rotor and a field winding on a stator. The exciter stator may include permanent magnets.

Figure 3:
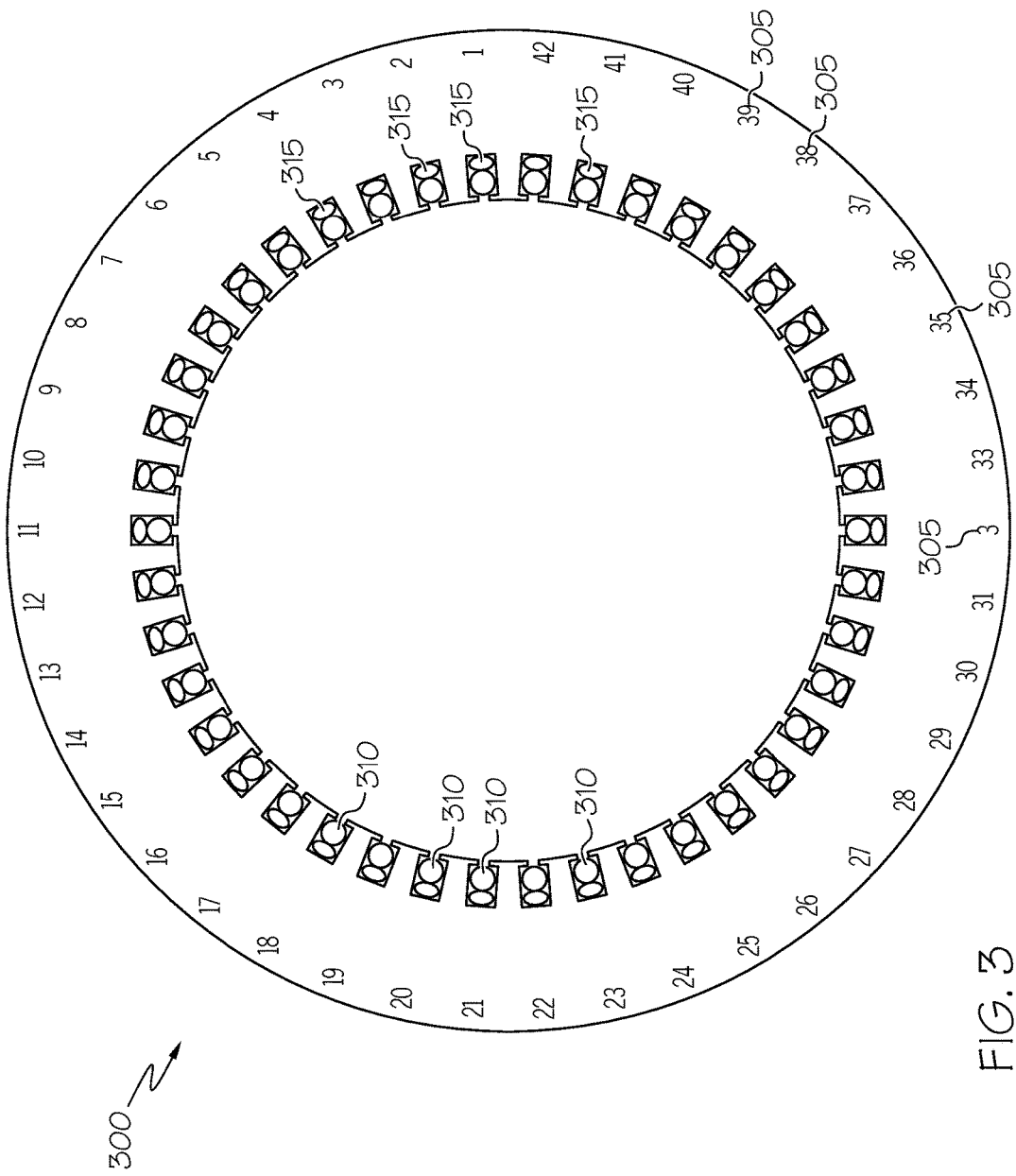
FIG. 3 depicts a cross-section view of a main generator stator according to an exemplary embodiment of the present invention.

Turning to FIG. 3, a main generator stator 300 may include a plurality of main generator poles 305, a plurality of main generator main stator windings 310, and a plurality of main generator stator auxiliary windings 315. The main generator stator 300 may form part of a generator/exciter (e.g., generator/exciter 105 of FIG. 1) and/or a main generator stator (e.g., main stator 205 of FIG. 2). The plurality of main generator main stator windings 310 may be arranged in a three-phase configuration (e.g., main generator stator main windings 206, 207, 208 of FIG. 2). The plurality of a main generator auxiliary stator windings 315 may be arranged in a three-phase configuration (e.g., main generator stator auxiliary windings 210, 211, 212 of FIG. 2). As illustrated in FIG. 3, the main windings, which generate power to the load, are located next to respective slot openings. The auxiliary windings, which power the GCU, are located at a bottom of the respective slot, next to a yoke. Positions of these main windings and auxiliary windings may be switched. Pole numbers are included in FIG. 3 for illustrating an example slot sequence. The specific pole numbers as shown in FIG. 3 are not intended to limit the apparatus in any way.

Figure 4:
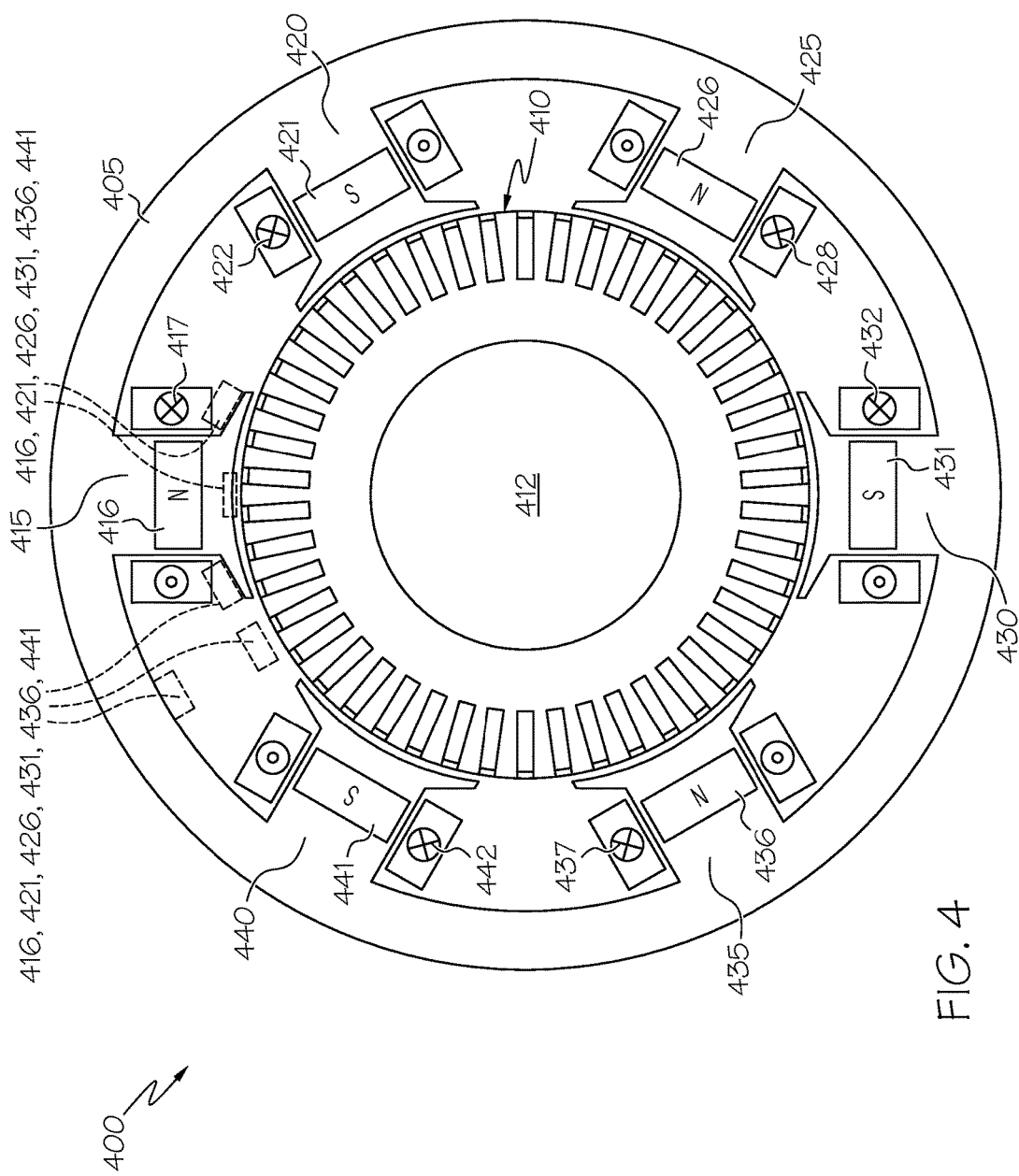
FIG. 4 depicts a cross-section view of an exciter generator according to an exemplary embodiment of the present invention.

With reference to FIG. 4, an exciter generator 400 may include an exciter stator 405, an exciter rotor 412, and an air gap 410 between the exciter stator 405 and the exciter rotor 412. The exciter generator 400 may form part of a generator/exciter (e.g., generator/exciter 105 of FIG. 1) and/or an exciter stator (e.g., exciter stator 224 of FIG. 2). The exciter stator 405 may include a plurality of exciter stator poles 415, 420, 425, 430, 435, 440; a plurality of exciter stator permanent magnets 416, 421, 426, 431, 436, 441; and a plurality of exciter stator windings 417, 418, 422, 423, 427, 428, 432, 433, 437, 438, 442, 443.

Typically, a generator may be required to provide 2.5 to 3 pu short circuit current, to a GCU, for 5 seconds for fault clearing. By definition, a point of regulation (POR) voltage of a main generator output will be close to zero during a short circuit. Therefore, if a GCU was supplied from the same main generator output, the GCU will have no power and the main generator will go off-line. There are multiple ways to keep power to the GCU for the duration of the short circuit. One possibility is to use a separate main stator winding in a permanent magnet generator (PMG) (e.g., auxiliary windings 210, 211, 212 of FIG. 2). These separate (or auxiliary) windings may be designed with wires having a diameter less than wires used in the main stator windings, given the low power rating and short duration required for the auxiliary windings. The associated wires may be distributed, for example, over entire stator slots, and may be designed to be magnetically decoupled from the main generator main stator windings.

As illustrated in FIG. 4, permanent magnets 416, 421, 426, 431, 436, 441 may be added to the exciter generator stator 400 in any of the locations as depicted with either solid or dashed lines. These permanent magnets 416, 421, 426, 431, 436, 441 may be used to self-excite the exciter generator 400 and, thereby, eliminate a separate PMG. For example, the permanent magnets 416, 421, 426, 431, 436, 441 in the exciter stator 400 may create flux to generate initial voltage across generator main terminals, or from a dedicated winding 221, 222, 223, once the exciter generator is rotating. This initial voltage may be fed to a generator control unit (GCU) 110, and when the voltage reaches a predetermined level, the GCU 110 may begin to provide electric current to exciter stator windings, which adds to the associated field flux. At this point, the exciter stator winding 221, 22, 223 and permanent magnets 416, 421, 426, 431, 436, 441 may both create flux to generate an ever larger voltage at the terminals of the exciter generator, until rated voltage is achieved. This approach may also reduce excitation requirements from the GCU 110.

A separate PMG may be eliminated since the permanent magnets 416, 421, 426, 431, 436, 441 in the exciter stator may provide an initial self-excitation, which in turn can be used to provide excitation for the exciter generator via the generator control unit (GCU) 110. Windings 206, 207, 208 in a main generator 205, 215 may be used to supply electric power to the GCU 110, thereby, eliminating dedicated PMG feeders. Alternatively, auxiliary windings 210, 211, 212 may be included in a stator 205, 300 of a main generator to supply the GCU 110. The auxiliary windings 210, 211, 212 may continue to provide power to the GCU 110 in the event that the main generator outputs 206, 207, 208 are short circuited. Since the exciter output may be rectified to the main generator rotor field 216, and a main generator waveform and power quality, may not be compromised by adding the permanent magnets 416, 421, 426, 431, 436, 441 in the exciter stator 400. The permanent magnets 416, 421, 426, 431, 436, 441 may be chosen such that a normal regulation performance of the generator 205, 215, via the GCU 110 and exciter generator 220, 224, may be unaffected (including load-off transient performance).

Permanent magnets 416, 421, 426, 431, 436, 441 may be inserted within an exciter generator stator 400, or may be adhered to a surface of the stator core pole shoes, in a fashion that the majority of the generated flux will travel across an associated air gap, enter into an exciter rotor, and induce voltage in a main generator rotor winding 216 to provide initial excitation to start the self-excitation process. Alternatively, the permanent magnets 416, 421, 426, 431, 436, 441 may supply additional flux to boost generator flux during normal generator or starter operations. Several configurations for the permanent magnets 416, 421, 426, 431, 436, 441 can provide necessary flux pattern. For example, an alternative arrangement for the permanent magnets 416, 421, 426, 431, 436, 441 is to insert a permanent magnet section axially between exciter stator laminations with two non-magnetic barriers (e.g., one permanent magnet 416, 421, 426, 431, 436, 441 on each side, or put a magnet section at the end of the exciter stator lamination with one non-magnetic barrier.

It should be understood, of course, that the foregoing relates to exemplary embodiments of the invention and that modifications may be made without departing from the spirit and scope of the invention as set forth in the following claims.

What is claimed is:

1. A self-exciting electrical generator, comprising:
   a main generator including:
      a rotor having a plurality of field windings configured to receive electrical power from an exciter of the self-exciting electrical generator; and
      a stator including:
         a plurality of main stator windings configured to supply electrical power to an electrical load bus associated with the self-exciting electrical generator, the main stator windings formed of a wire of a first gauge, and
         a plurality of auxiliary stator windings, electrically isolated and magnetically decoupled from the main stator windings, configured to supply electrical power to a generator control unit of the self-exciting electrical generator, the plurality of auxiliary stator windings formed of a wire having a second gauge that is less than the first gauge.

2. The self-exciting generator of claim 1, further comprising a rotating rectifier.

3. The self-exciting generator of claim 1, wherein the main stator windings are arranged in a three-phase configuration.

4. The self-exciting generator of claim 1, wherein the auxiliary windings are configured in a three-phase configuration.

5. The self-exciting generator of claim 1, wherein the main stator windings are located within the stator closer to the rotor relative to the auxiliary windings.

6. The self-exciting generator of claim 1, wherein the rotor windings are arranged in a single phase configuration.

7. A self-exciting electrical generator assembly, comprising:
   an exciter generator;
   a main generator including a rotor having a plurality of field windings configured to receive electrical power from the exciter generator; and
   a stator having a plurality of main stator windings and a plurality of auxiliary stator windings electrically isolated and magnetically decoupled from the main stator windings.

8. The self-exciting electrical generator assembly of claim 7, wherein the exciter generator includes an exciter stator having a plurality of permanent magnets.

9. The self-exciting electrical generator assembly of claim 7, wherein the exciter generator includes an exciter stator having a plurality of exciter stator windings.

10. The self-exciting electrical generator assembly of claim 7, wherein the exciter generator includes an exciter rotor having a plurality of exciter rotor windings.

11. The self-exciting electrical generator assembly of claim 10, wherein the plurality of exciter rotor windings are arranged in a three-phase configuration.

12. The self-exciting electrical generator assembly of claim 7, wherein the main generator further comprises a rotating rectifier, wherein the exciter generator includes an exciter rotor having a plurality of exciter rotor windings, and wherein the exciter rotor windings are connected to the rotating rectifier.

13. The self-exciting electrical generator assembly of claim 12, wherein the plurality of exciter rotor windings are arranged in a three-phase configuration and the rotating rectifier is three-phase.

14. An electrical generator system, comprising:
    a generator control unit;
    an exciter generator; and
    a main generator including a rotor and a stator, wherein the stator includes:
       a plurality of main stator windings to supply electrical power to an electrical load bus, and
       a plurality of auxiliary windings, magnetically decoupled and electrically isolated, from the plurality of main stator windings, to supply electrical power to the generator control unit.

15. The electrical generator system of claim 14, wherein the main stator windings include a first gauge wire and the auxiliary windings include a second gauge wire, wherein a second diameter of the second gauge wire is less than a first diameter of the first gauge wire.

16. The electrical generator system of claim 14, wherein the main stator windings are electrically isolated from the auxiliary stator windings.

17. The electrical generator system of claim 14, wherein the exciter generator includes an exciter stator having a plurality of permanent magnets.

18. The electrical generator system of claim 14, wherein the generator control unit is configured to receive at least one of a main generator output current signal or a main generator output voltage signal.

19. The electrical generator system of claim 18, wherein the generator control unit is further configured to provide an exciter generator output signal that is based on at least one of the main generator output current signal or the main generator output voltage signal.

* * * * *